(12) United States Patent
Farley et al.

(10) Patent No.: US 12,532,808 B2
(45) Date of Patent: Jan. 27, 2026

(54) PASSIVE HEADER TILT CONTROL FOR RIGID-MODE OPERATION WITH FRICTION-CONTROLLING CYLINDERS

(71) Applicant: CNH Industrial America LLC, New Holland, PA (US)

(72) Inventors: Herb Farley, Elizabethtown, PA (US); Cory Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 833 days.

(21) Appl. No.: 17/848,648

(22) Filed: Jun. 24, 2022

(65) Prior Publication Data

US 2023/0413728 A1    Dec. 28, 2023

(51) Int. Cl.
*A01D 41/14* (2006.01)
*A01D 41/16* (2006.01)
*A01D 75/28* (2006.01)

(52) U.S. Cl.
CPC .......... *A01D 41/16* (2013.01); *A01D 41/141* (2013.01); *A01D 75/287* (2013.01)

(58) Field of Classification Search
CPC ...... A01D 41/00–41/16; A01D 75/00–75/306; A01D 41/141; A01D 75/287; A01F 12/10
See application file for complete search history.

(56) References Cited

U.S. PATENT DOCUMENTS

| | | | | |
|---|---|---|---|---|
| 3,485,020 | A * | 12/1969 | Burrough | A01D 34/24 56/212 |
| 4,280,317 | A * | 7/1981 | Lindblom | A01D 41/16 56/208 |
| 4,527,381 | A * | 7/1985 | Mann | A01D 75/287 56/16.2 |
| 4,594,840 | A * | 6/1986 | D'Almeida | A01D 41/141 56/11.2 |
| 4,733,523 | A * | 3/1988 | Dedeyne | A01D 41/145 56/10.2 E |
| 5,359,836 | A | 11/1994 | Zeuner et al. | |
| 5,799,483 | A | 9/1998 | Voss et al. | |

(Continued)

FOREIGN PATENT DOCUMENTS

DE   4193815 B3   10/2020
EP   0092806 A1 *  11/1983   ............. A01D 67/00

(Continued)

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

A faceplate sub-assembly for an agricultural vehicle includes a faceplate and at least one biasing element. The faceplate is configured to be connected between (i) a feederhouse defining an inlet opening through which crop material is delivered for processing by the agricultural vehicle, and (ii) a header of the agricultural vehicle. The faceplate is configured to be pivotably mounted to the feederhouse such that the faceplate is configured for lateral tilting relative to the feederhouse. The at least one biasing element has one end connected to the faceplate and another end that is configured to be connected to the feederhouse for reducing a friction force at the interface between the faceplate and the feederhouse to accommodate lateral tilting of the faceplate.

12 Claims, 3 Drawing Sheets

(56) References Cited

U.S. PATENT DOCUMENTS

| | | | | |
|---|---|---|---|---|
| 8,079,204 B2 * | 12/2011 | Coers | ...................... | A01D 41/14 |
| | | | | 56/15.8 |
| 8,087,224 B1 * | 1/2012 | Coers | ...................... | A01D 57/20 |
| | | | | 56/153 |
| 9,730,375 B2 * | 8/2017 | De Coninck | ........ | A01B 63/008 |
| 10,159,182 B2 * | 12/2018 | Berggren | ............. | A01B 63/023 |
| 10,426,089 B2 | 10/2019 | Matousek et al. | | |
| 10,531,607 B2 | 1/2020 | Schroeder et al. | | |
| 10,701,862 B2 | 7/2020 | Thomson | | |
| 10,905,049 B2 * | 2/2021 | Lucca | .................... | A01D 45/10 |
| 2013/0298515 A1 * | 11/2013 | Lohrentz | .............. | A01D 41/141 |
| | | | | 56/51 |
| 2017/0013778 A1 * | 1/2017 | Borry | ...................... | A01D 41/16 |
| 2022/0394928 A1 * | 12/2022 | Seiders, Jr. | .......... | A01D 41/145 |

FOREIGN PATENT DOCUMENTS

| | | | | |
|---|---|---|---|---|
| EP | 0421042 A1 * | 4/1991 | ........... | A01D 43/077 |
| EP | 3072382 A1 * | 9/2016 | ........... | A01D 75/287 |
| EP | 3735817 A1 | 11/2020 | | |
| WO | 2021014254 A1 | 1/2021 | | |

\* cited by examiner

PASSIVE HEADER TILT CONTROL FOR RIGID-MODE OPERATION WITH FRICTION-CONTROLLING CYLINDERS

FIELD OF THE INVENTION

The present invention relates to agricultural vehicles, and, more particularly, to agricultural vehicles which include a header and feederhouse.

BACKGROUND OF THE INVENTION

As is described in U.S. Pat. No. 10,531,607, which is incorporated by referenced herein in its entirety and for all purposes, systems for controlling lateral tilt and height of harvesting headers on a variety of agricultural machines and vehicles, particularly harvesting machines such as combines and windrowers, are known. Such known systems typically utilize an electro-hydraulic or mechanical apparatus for controlling the lateral tilt, to maintain a desired uniform distance between the header and a ground surface there below without action by the operator.

Harvesting headers operate most effectively when they closely follow changing ground contours. A lateral tilt action paired with a raise lower action can be used to control the height and lateral incline of a header with respect to the ground. These actions can be performed actively, using hydraulic cylinders to forcefully move the header. An advantage of this type of control is that no contact with the ground is necessary to induce movement allowing the header to follow the ground from a suspended height. Gauge wheels can be installed to prevent unavoidable contact with the ground and assist the active hydraulic control.

Some current designs use a pivot pin that is oriented about an axis in the forward driving direction (see 'F' in FIG. 1) and located above the crop-flow opening in a feeder (also known as a feederhouse) of the agricultural vehicle. The weight of the header in front of this point causes a large compressive force on the faceplate of the feeder below the crop flow opening. The force is in the direction of arrow 90 in FIG. 2. This large compressive force distributed over a planar bearing surface can create a large frictional resistance to a lateral tilt action.

What is needed in the art is an agricultural harvester capable of facilitating low-friction lateral tilting of the header.

It is noted that the statements in the background section are not necessarily admitted prior art.

SUMMARY OF THE INVENTION

In accordance with an aspect of the present invention, a faceplate sub-assembly for an agricultural vehicle includes a faceplate and at least one biasing element. The faceplate is configured to be connected between (i) a feederhouse defining an inlet opening through which crop material is delivered for processing by the agricultural vehicle, and (ii) a header of the agricultural vehicle. The faceplate is configured to be pivotably mounted to the feederhouse such that the faceplate is configured for lateral tilting relative to the feederhouse. The at least one biasing element has one end connected to the faceplate and another end that is configured to be connected to the feederhouse for reducing a friction force at the interface between the faceplate and the feederhouse to accommodate lateral tilting of the faceplate.

DETAILED DESCRIPTION OF THE INVENTION

Figure 1:
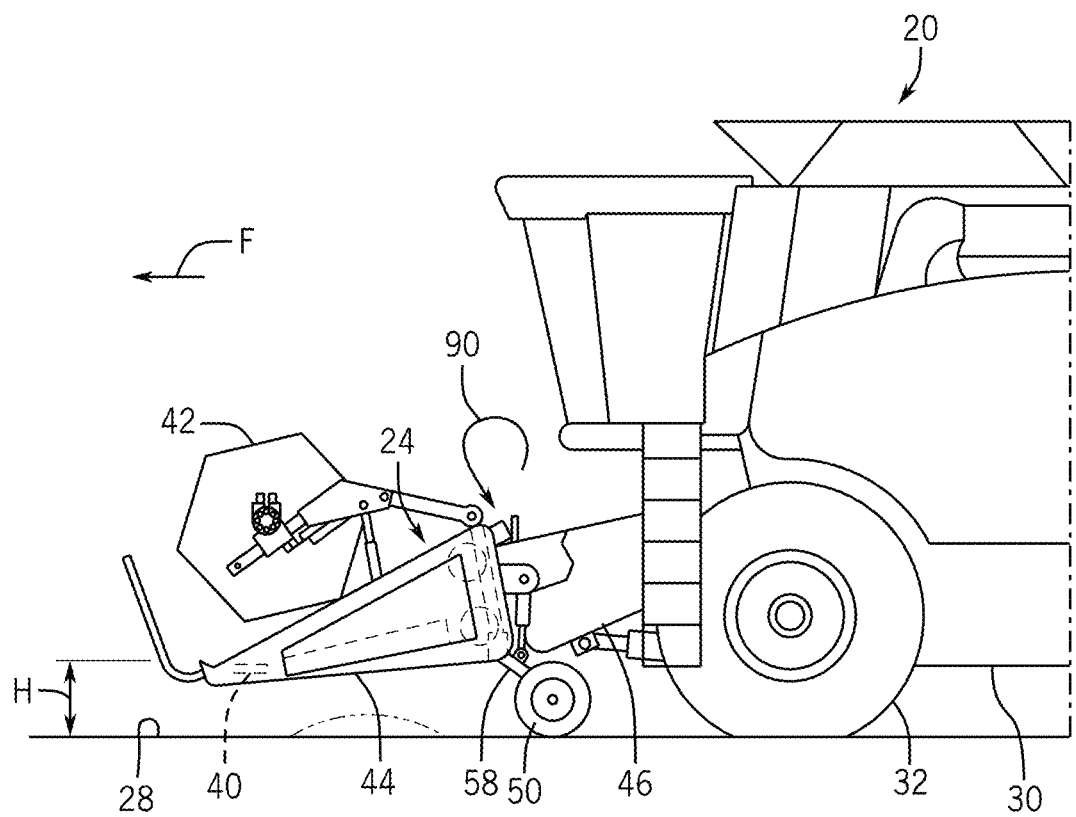
FIG. 1 is a fragmentary side view of the front end of a representative harvesting machine.
Figure 2:
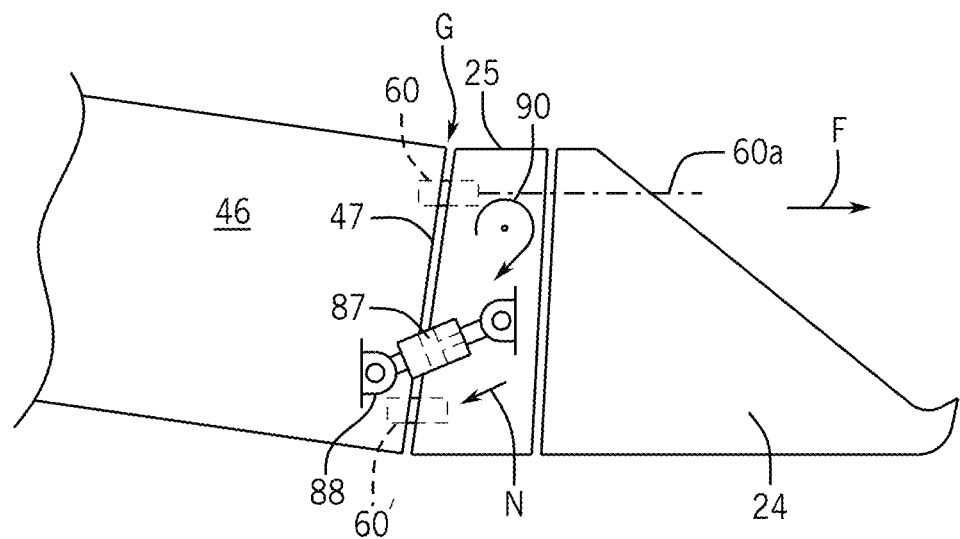
FIG. 2 is a further fragmentary side view of the front end of the machine of FIG. 1 showing the interconnection between the feeder, faceplate and header, according to a first exemplary embodiment of the invention.

Referring now to the drawings, in FIGS. 1 and 2, harvesting machine 20 is a self-propelled combine harvester having a chassis 30 carrying a conventionally configured and operable engine and power train that drives tracks or wheels 32, and powers cutting apparatus 40 of a header 24, which can comprise a conventionally configured and operable sickle cutter, disk cutters, or the like, as well as a reel 42, and gathering apparatus 44, which here is a draper belt system but could be an auger device, all of which are conventionally configured and operable.

Figure 3:
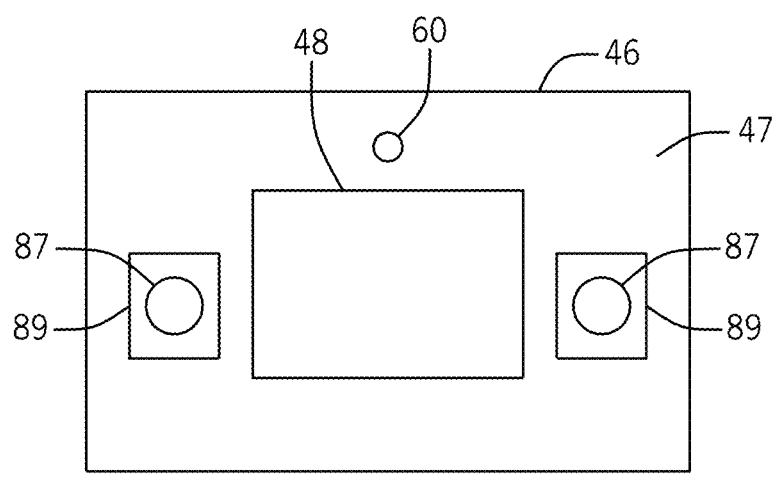
FIG. 3 is a front view of feeder showing an alternative position for biasing elements. The faceplate and header are omitted from FIG. 3.

A center region of header 24 is supported on machine 20 by a feeder 46, the front end of which is movable upwardly and downwardly relative to machine 20 for setting a cut height, denoted by height H in FIG. 1, at which plants will be cut from the ground. The cut plants will then fall onto a floor or pan of header 24, aided by reel 42, and pass onto gathering apparatus 44. The cut plants are then carried by apparatus 44 to an inlet opening 48 (FIG. 3) of feeder 46, which will induct the cut plants and carry them internally therethrough into machine 20 for processing, all in the conventional, well-known manner.

Gauge wheels 50 or skids depend from or connect to opposite lateral ends of header 24 with support apparatus 58. Each resilient support apparatus 58 is configured and operable to allow the associated wheel 50 to contact and move along the ground surface and follow the contour thereof, and to carry or support a portion of the weight of the associated lateral end if desired. Gauge wheels 50 are optional features of machine 20 and may be omitted.

A pin 60 is fixed to feeder 46 and extends from the front face 47 of feeder 46 in the forward direction F (i.e., along the longitudinal axis of the machine 20). A faceplate 25 (shown exaggerated in FIG. 2, but not shown in FIG. 1) is mounted to feeder 46 and positioned on pin Pin 60 allows lateral tilting of faceplate 25 about a pivotal axis 60a defined by pin 60. Pin is positioned above inlet opening 48. Alternatively, pin may be positioned below inlet opening 48. The alternative position of pin is represented by pin 60'. It should be understood that feeder 46 includes either pin 60 or pin 60', but not both.

Header 24 is removably connected to the faceplate 25 by one or more hooks (or other attachment surface/mechanism, for example). Once connected to faceplate 25, header 24 moves with faceplate 25. Alternatively, header 24 may be fixedly connected to faceplate 25, such that header 25, faceplate 25 and biasing elements 87 form a sub assembly that is releasably mounted to feeder 46.

In the absence of the biasing elements 87, which will be described hereinafter, the weight of the header 24, when attached to the faceplate 25, can cause the header 24 (as well as the faceplate 25 to which it is mounted) to rotate in the direction of arrow 90 towards the ground 28 relative to the feeder 46. Specifically, the bottom of the header 24 can press into the bottom of the feeder 46 with a normal force 'N,' thereby increasing pressure (i.e., friction) between the bottom front face 47 of the feeder 46 and the bottom rear face of the header 24. The increased pressure and friction at that interface can inhibit lateral tilting of the faceplate 25 (and header 24) relative to feeder 46. Also, as a result of the weight of header 24, the top of the header 24 can pull away from the top of the feeder 46, thereby creating a gap 'G' between faceplate 25 and feeder 46. The aforementioned gap G can result in the undesirable loss of crop material through the gap G at the intersection of inlet opening 48 and the feeder 46.

FIG. 2 is a further fragmentary side view of the front end of the machine of FIG. 1 showing the interconnection between the feeder 46, faceplate 25 and header 24, according to a first exemplary embodiment of the invention. As shown in FIG. 2, to counteract the above-described gap and increased pressure, normal force and friction at the intersection between the feeder 46 and faceplate 25, feeder 46 includes one or more biasing elements 87 (e.g., one per lateral side). Biasing elements 87 may be in the form of springs, hydraulic cylinders (as shown in FIG. 2), pneumatic cylinders, compression springs or tension springs. The ends of each biasing element 87 may be connected to the feeder 46 and faceplate 25 by removable pins, for example.

As best shown in FIG. 2, the (conventional) hydraulic cylinder includes a hollow chamber, and a slidable piston positioned within the hollow chamber that delimits two opposing sub-chambers (i.e., pressure chambers) defined on opposing sides of the piston, whereby each sub-chamber communicates with a fluid line for distributing fluid to/from the respective sub-chamber.

Biasing element 87 shown in FIG. 2 is (optionally) a hydraulic cylinder. One end/shaft of the element 87 is mounted to a swiveling ball joint 88 that is fixed to feeder 46. The other end/shaft of element 87 is mounted to a swiveling ball joint 88 that is fixed to faceplate 25. Ball joint 88 allows for rotation of the element 87 ends with three rotational degrees of freedom. Also, element 87 is capable of extension and retraction, and the ball joints 88 can accommodate that movement as well.

Extension of biasing element 87 would result in rotation of faceplate 25 as well as header 24 in a rotational direction that is opposite of arrow 90. Rotating faceplate 25 and header 24 in a rotational direction that is opposite of arrow 90 would counteract (i) the above-described gap and (ii) the increased pressure, normal force and friction at the intersection between the feeder 46 and faceplate 25. Accordingly, faceplate 25 would be free to tilt in the lateral direction (i.e., about axis/direction F), and without a significant gap at G. Retraction of biasing element 87 would have the opposite effect. The internal fluid pressure within biasing element 87, which influences extension/retraction of biasing element 87, may be set by a user prior to use. Alternatively, the internal pressure may be adjusted continuously during operation.

The elements 87 can be adjusted, for example, depending upon the weight of header 24. The weight of header 24 can change in use depending upon whether the header 24 contacts the ground, for example. If elements 87 were springs, then it is submitted that while springs allow for a lower-cost solution they might not address the potential for on-the-go adjustments. For example, as the weight of header 24 on the ground surface 28 increases, the elements 87 would need to reduce output to maintain the same level of contact force.

Biasing elements 87 could be located on the exterior sides of feeder 46, as shown in FIG. 2. Alternatively, turning to FIG. 3, biasing elements 87 could be mounted in respective recesses 89 disposed in the front face 47 of feeder 46. Faceplate 25 could have similar recesses for receiving the other ends of the biasing elements 87. As another alternative, biasing elements 87 could be mounted within inlet opening 48. While a single biasing element 87 could be employed, utilizing two biasing elements 87 should sufficiently balance the normal forces on either transverse side of faceplate 25.

The components of the combine may be combined together in a variety of different ways. As one example, the faceplate 25 and biasing elements 87 may be connected together to form a faceplate subassembly. As another example, the faceplate 25, biasing elements 87 and header 24 may be connected together to form a header subassembly. As yet another example, the faceplate 25, biasing elements 87 and feeder 46 may be connected together to form a feeder subassembly. Each of the aforementioned subassemblies may be sold and/or distributed separately from the vehicle.

Figure 4A:
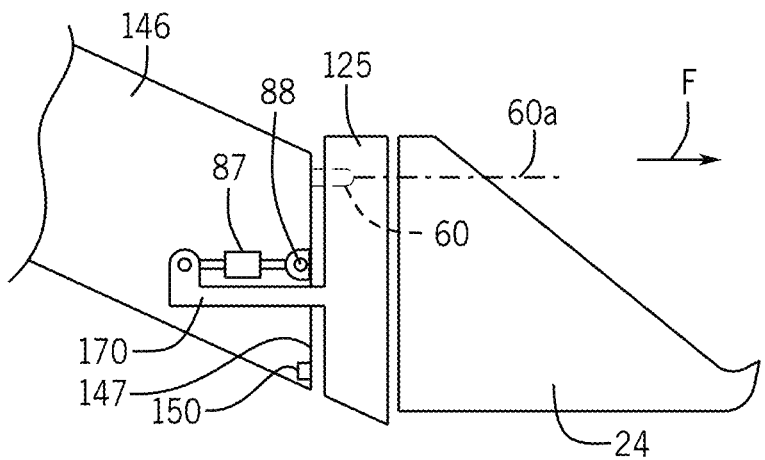
FIG. 4A is a further fragmentary side view of the front end of the machine of FIG. 1 showing the interconnection between the feeder, faceplate and header, according to a second exemplary embodiment of the invention.
Figure 4B:
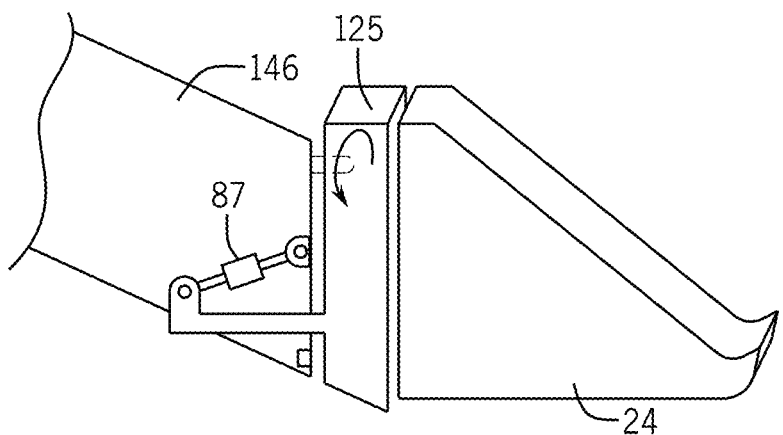
FIG. 4B is another side view of the front end of FIG. 4A, whereby the header and faceplate are shown tilted to the right.
Figure 4C:
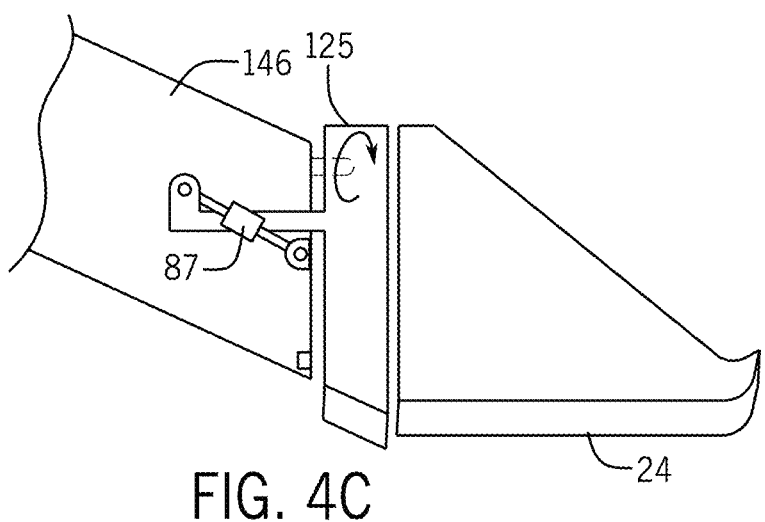
FIG. 4C is another side view of the front end of FIG. 4A, whereby the header and faceplate are shown tilted to the left.

FIGS. 4A-4C depict further fragmentary side views of the front end of the machine of FIG. 1 showing the interconnection between the feeder 46, faceplate 25 and header 24, according to a second exemplary embodiment of the invention. FIG. 4A depicts a straight (non-tilted) header and feeder; FIG. 4B depicts the header and feeder tilted to the right about axis 60*a*; and FIG. 4C depicts the header and feeder tilted to the left about axis 60*a*.

The primary difference between the first and second embodiments is that biasing elements 87 are mounted (or operated) in a state of tension in the second embodiment whereas the biasing elements 87 are mounted (or operated) in a state of compression in the first embodiment. In the first embodiment, biasing elements 87 are expanded to reduce the friction force between the faceplate 25 and feeder 46, whereas, in the second embodiment, biasing elements 87 are retracted to reduce that same friction force. Operating the biasing element 87 in a state of tension (in the second embodiment) is particularly useful because it limits or prevents an unstable equilibrium of faceplate 25/header 24 once those components are laterally tilted. Stated differently, operating the biasing element 87 in a state of tension prevents inadvertent over-rotation of faceplate 25/header 24 once those components begin to laterally rotate.

More particularly, in the second embodiment, one end of biasing element 87 is mounted to a ball joint 88 located near the front face 147 of the feeder 146. Other than the location of the ball joint mount, feeder 146 is virtually the same as feeder 46. The other end of biasing element 87 is mounted to a ball joint 88 formed on the free end of an arm 170 extending from the rear facing surface of faceplate 125. The arm 170 extends to a location that is rearward of the front face 147 of the feeder 146. Also, the entirety of each biasing element 87 is rearward of the front face 147 of the feeder 146. Arm 170 may be referred to as an extension, projection or post. With the exception of arm 170 and its ball joint, faceplate 125 is virtually the same as faceplate 25. Each ball joint 88 has three rotational degrees of freedom.

FIGS. 4B and 4C show how the orientation of biasing element 87 changes as faceplate 125 (along with header 24) are pivoted about axis 60*a* defined by pin 60. It is noted that the feeder 146, as well as the ball joint 88 on feeder 146, remain stationary as faceplate 125 rotates about axis 60*a*.

In the second embodiment of FIGS. 4A-4C, retraction force from the biasing elements 87 create a stable equilibrium where an increasing restoring torque is enacted on the header 24 as the header 24 is laterally tilted. The created effect is that, though friction forces increase as the biasing elements 87 deviate from the perpendicular orientation shown in FIG. 4A, the torque from the biasing elements 87 centers and assists the faceplate 25 (and header 24) to return to level relative to the feeder 146.

The forces exerted by biasing elements 87 can be managed either passively (i.e., adjusted by an end user as needed) or actively. To actively manage biasing element 87, machine 20 may include a pressure sensor 150 (FIG. 4A) at the interface between faceplate 25 and feeder 46 to sense the pressure at that interface. The user may enter a pre-determined pressure, or that pre-determined pressure may be factory set, and the machine 20 will automatically adjust the forces exerted by biasing elements 87 (i.e., by increasing/decreasing the fluid pressure in a chamber of element 87 that causes expansion or retraction of biasing element) based on the pressure readings identified by the pressure sensor 150.

In light of all the foregoing, it should thus be apparent to those skilled in the art that there has been shown and described header tilt control. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A faceplate sub-assembly for an agricultural vehicle, said faceplate sub-assembly comprising:
   a faceplate that is configured to be connected between (i) a feederhouse defining an inlet opening through which crop material is delivered for processing by the agricultural vehicle, and (ii) a header of the agricultural vehicle, wherein the faceplate is configured to be pivotably mounted to the feederhouse such that the faceplate is configured for lateral tilting relative to the feederhouse; and
   at least one biasing element having one end connected to the faceplate and another end that is configured to be connected to the feederhouse for reducing a friction force at the interface between the faceplate and the feederhouse to accommodate later tilting of the faceplate,
   wherein the faceplate includes a mounting arm extending rearwardly of the interface between the faceplate and the feederhouse as viewed in a forward direction of travel of the vehicle, wherein the biasing element is mounted to the arm at a location that is rearward of the interface.

2. The faceplate sub-assembly of claim 1, wherein the faceplate is pivotably mounted to the feederhouse by a pin defining a pivot axis of the faceplate, wherein the pivot axis extends substantially parallel to a forward direction of the vehicle.

3. The faceplate sub-assembly of claim 2, wherein the pin is located above the inlet opening.

4. The faceplate sub-assembly of claim 2, wherein the pin is located below the inlet opening.

5. The faceplate sub-assembly of claim 1, wherein the biasing element is a hydraulic cylinder, a pneumatic cylinder or a spring.

6. The faceplate sub-assembly of claim 1, wherein the at least one biasing element comprises two biasing elements positioned on opposite sides of the inlet opening.

7. The faceplate sub-assembly of claim 1, wherein the biasing element is either operated or maintained in a state of tension for reducing the friction force at the interface between the faceplate and the feederhouse.

8. The faceplate sub-assembly of claim 1, wherein the biasing element is a hydraulic cylinder.

9. The faceplate sub-assembly of claim 1, wherein the biasing element is mounted to both the feederhouse and the faceplate by ball joints.

10. An assembly comprising the faceplate sub-assembly of claim 1 and the header that is releasably mounted to the faceplate sub-assembly.

11. An agricultural vehicle comprising the faceplate sub-assembly of claim 7 and the feederhouse.

12. The agricultural vehicle of claim 11, wherein the agricultural vehicle is a combine harvester.

\* \* \* \* \*